United States Patent [19]

Mezei

[11] 4,198,076
[45] Apr. 15, 1980

[54] PIPE COUPLER WITH POSITIVE DISCONNECT DEVICE

[75] Inventor: George A. Mezei, Fullerton, Calif.

[73] Assignee: FMC Corporation, San Jose, Calif.

[21] Appl. No.: 941,627

[22] Filed: Sep. 12, 1978

[51] Int. Cl.² ............................................. F16L 23/00
[52] U.S. Cl. .................................. 285/18; 285/332.3; 285/364
[58] Field of Search ..................... 285/18, 364, 332.3, 285/332.2, 320, 406

[56] References Cited

U.S. PATENT DOCUMENTS

| 2,196,622 | 4/1940 | Bean | 285/332.3 |
| 3,033,597 | 5/1962 | Miller | 403/15 |
| 3,116,943 | 1/1964 | Wagner | 285/332.3 X |
| 3,131,642 | 5/1964 | Geer et al. | 285/55 X |
| 3,830,533 | 8/1974 | Mezei et al. | 285/364 |

Primary Examiner—Thomas F. Callaghan

Attorney, Agent, or Firm—L. B. Guernsey; W. W. Ritt, Jr.; J. F. Verhoeven

[57] ABSTRACT

A pipe coupler for releasably connecting two flanged pipes together in end-to-end manner, and with a means for positively disconnecting the pipes when the cpupler's grip thereof is released. A plurality of the couplers are mounted on and spaced around one of the pipe flanges, and each coupler has an arm with a jaw for gripping the opposing pipe flange and a stem slip-fitted into a housing so as to be rotatable and translatable relative thereto for effecting clamping and unclamping movement. A drawbolt is threaded into a bore in the stem to move the stem forward or backward with respect to the housing. A radially extending finger connected to the stem applies force against the opposing pipe flange to push the two flanges apart and positively separate the pipes as the stem moves outward from the housing.

12 Claims, 7 Drawing Figures

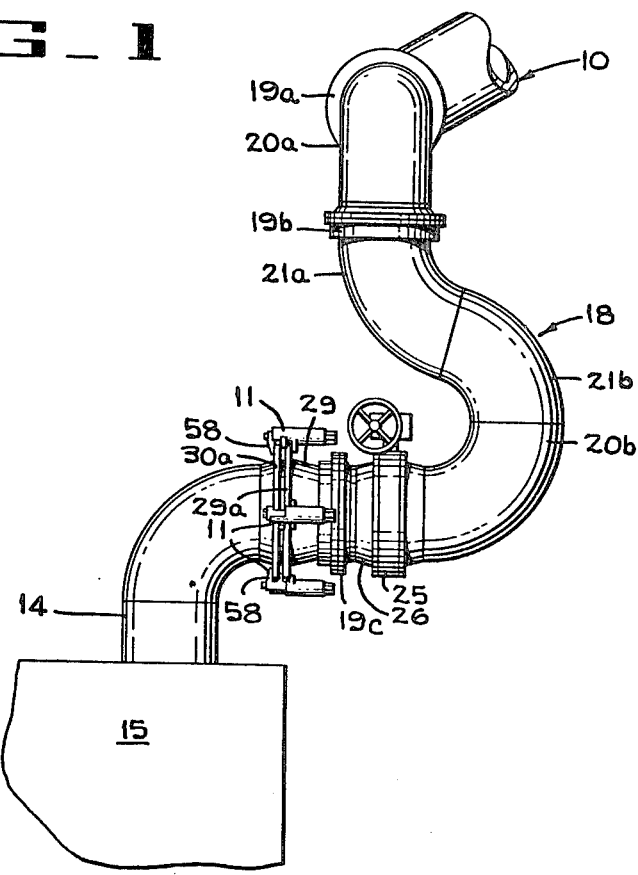
FIG_1
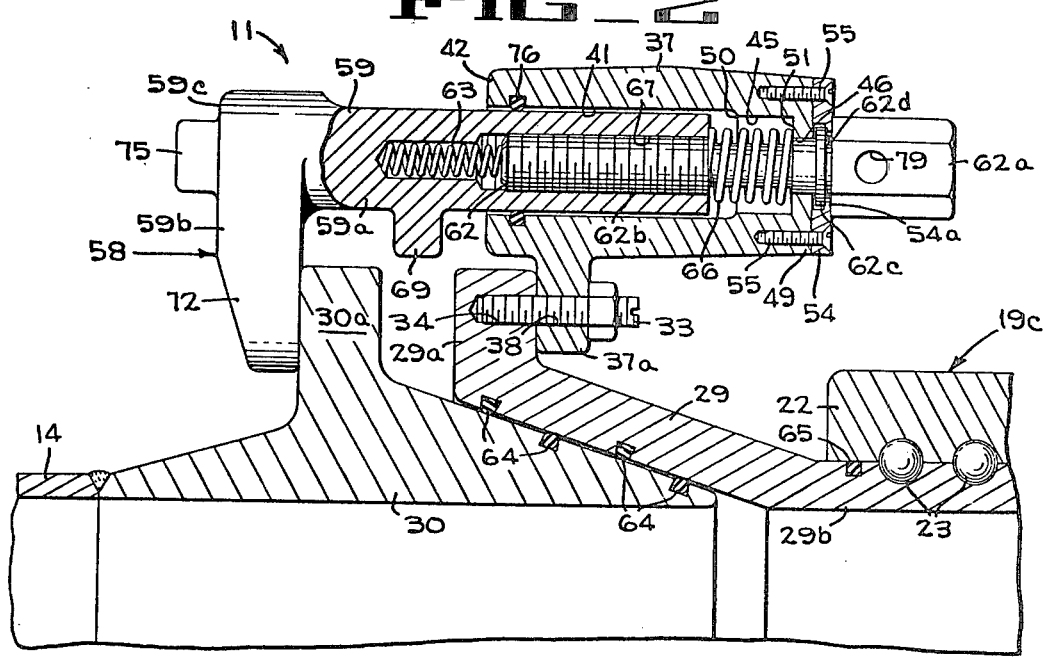
FIG_2

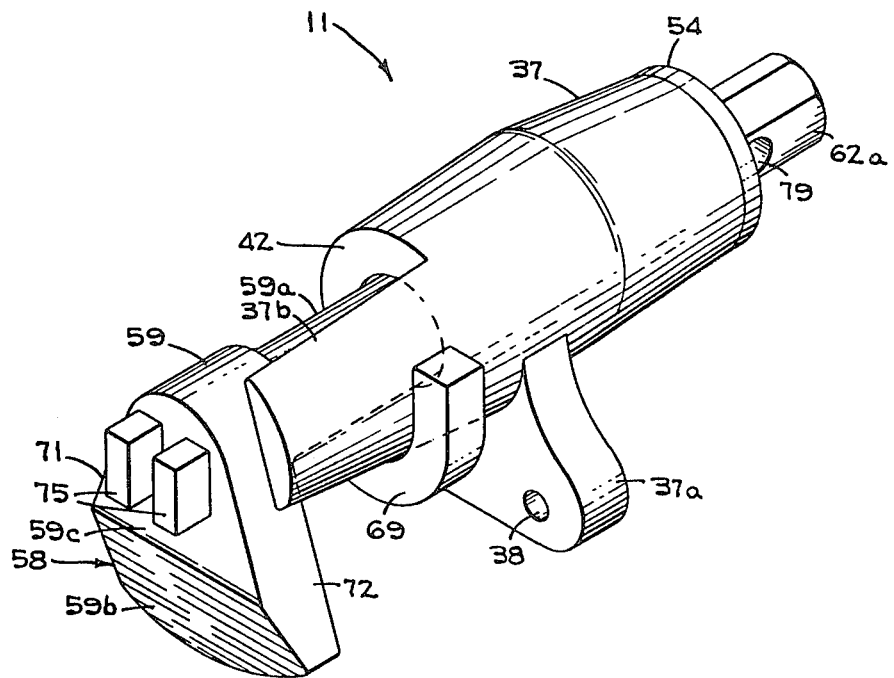
FIG_3
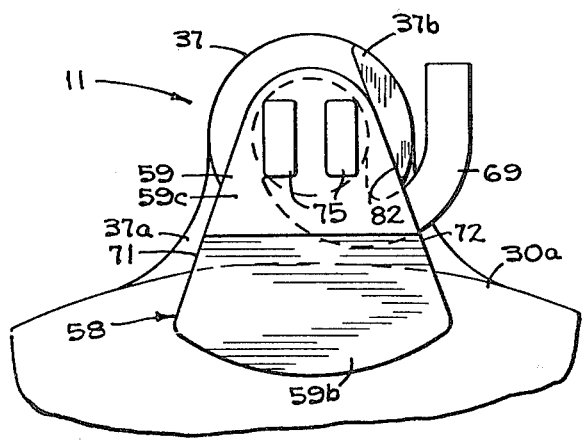
FIG_4
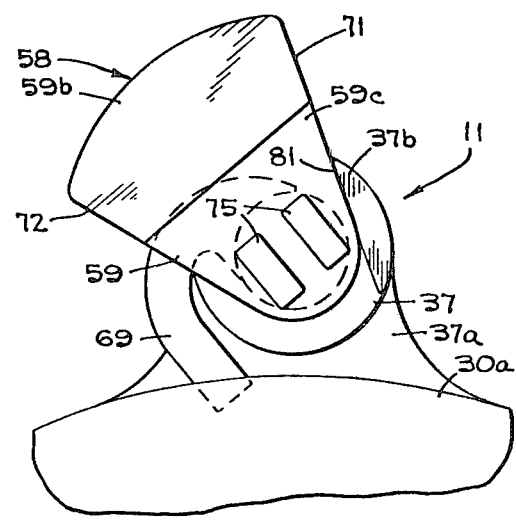
FIG_5

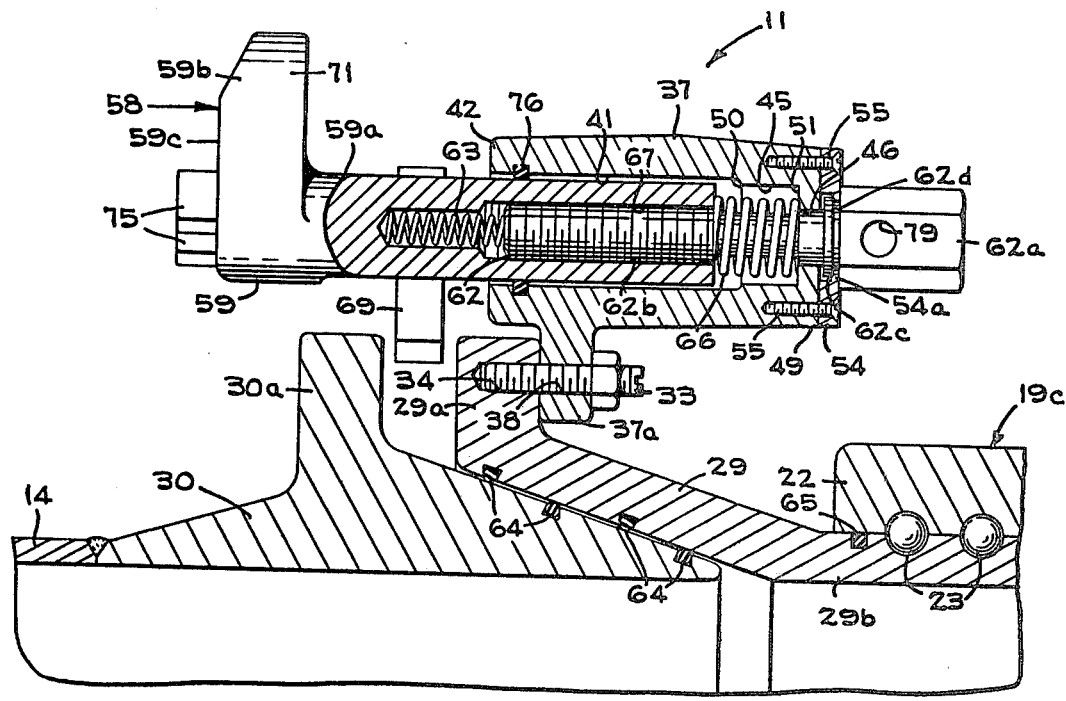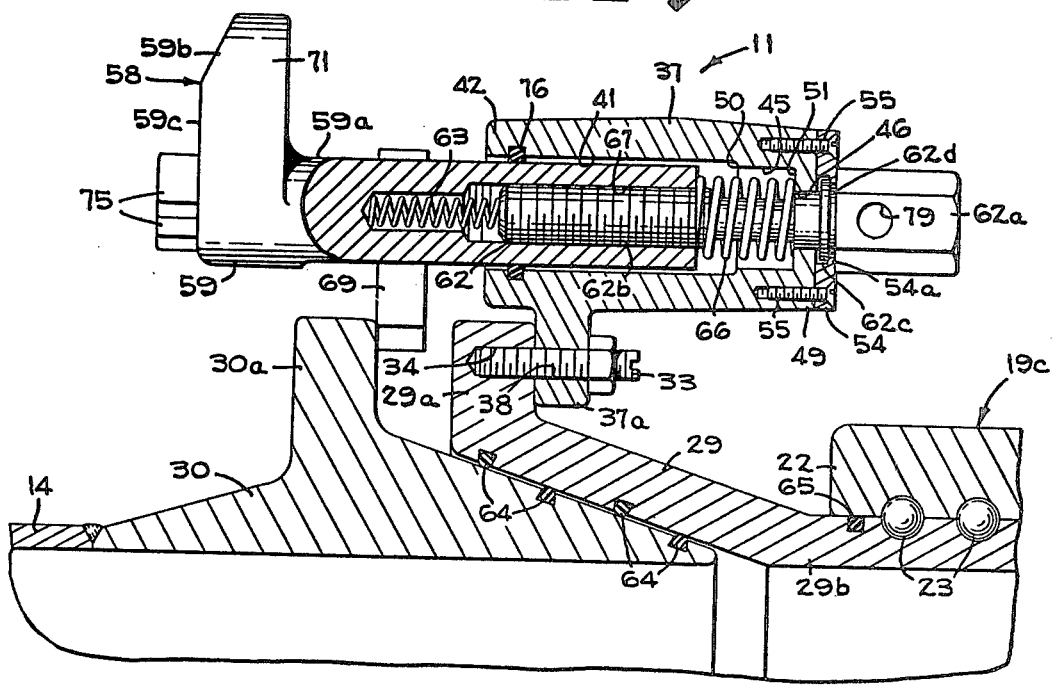

PIPE COUPLER WITH POSITIVE DISCONNECT DEVICE

BACKGROUND OF THE INVENTION

1. Field of the Invention

This invention relates to coupling devices, and more particularly to pipe coupling equipment especially suited for use in coupling or clamping two pipes together in an end-to-end relationship, and for forcing the pipes apart while they are being disconnected.

2. Description of the Prior Art

Coupling devices suited for clamping pipe or hose flanges together are commonly used in making fluid-tight connections in a quick, secure and safe manner between marine tanker manifolds and articulated loading arms mounted on docks or other stationary facilities. These prior art coupling devices are generally designed to work with cylindrical pipes or hoses having a radially extending flange at the end of the pipe and a cylindrical tanker manifold having a matching radially extending flange at the end thereof. The devices secure the two flanges together in a fluid-tight connection by means of clamps which vary in design from relatively simple couplers with C-type clamps to hydraulically powered couplers utilizing toggle actuated clamps. Some examples of these coupling devices are described in U.S. Pat. Nos. 2,916,789 to Hendrix; 3,473,830 to Haley; 3,489,434 to Haley; 3,586,350 to Ashton; 3,661,408 to Gibbons; and 3,830,533 to Mezei et al. These devices work quite well when connecting between a dock and a tanker anchored in a quiet harbor, but are less satisfactory in a location where there is considerable movement between the tanker and the receiving or storage facility.

With the advent of the supertanker, special problems arose in the design and use of connectors between the tanker manifold and the outboard end of marine loading arms. The reason for the special design problems is that most supertankers are too large to be unloaded at many of the existing docks and harbors. These supertankers require more space and more water depth than is available in many of the harbors. One way to alleviate this problem is to send out smaller tankers which meet and unload the supertanker on the open sea and the smaller tankers unload at the existing docks or harbors. This introduces additional problems because the large and small tankers move in relation to each other so much that it is difficult, if not impossible, to make transfer connections between the two vessels using the prior art cylindrical receiving manifolds and the cylindrical pipes at the outboard end of the marine loading arms.

One solution is to place a cone-shaped connector at the end of the receiving manifold on one tanker and a complementary cone-shaped connector at the end of the marine loading arm on the other tanker. The loading arm cone can readily be stabbed into the manifold cone to make the required connection. Flanges mounted near the ends of the cones can be clamped together to secure the cones in a fluid-tight connection. However, the use of the connecting cones introduces still another problem. The cones have a tendency to "stick together" when the fluid transfer has been completed so that it is often difficult to disconnect the connectors. What is needed is a coupling device that can clamp the cone on the loading arm to the cone of the manifold in a fluid-tight connection during fluid transfer and then force the cones apart when the transfer of fluid is completed.

SUMMARY OF THE INVENTION

The present invention provides a clamp-type flange coupling device suited for conveniently and safely making a fluid-tight connection between hoses or pipes having flanges thereon, with the device having a disconnect means for forcing the hose or pipe flanges apart when the pipes are to be disconnected. The device includes a plurality of rotary clamps, each of these clamps including a housing with an internal open-ended bore and a clamp arm slidably mounted in the housing bore. The device further includes means for securing the housing to one of the flanges and a movable clamping means mounted on the clamp arm for contacting the other flange and for moving the flanges together. Also mounted on the clamp arm is a movable disconnect finger which presses against the flange to force the connectors apart when the connectors are being disconnected.

BRIEF DESCRIPTION OF THE DRAWINGS

FIG. 1 is a diagrammatic illustration of the outboard end of a marine loading arm connected to a manifold flange of a marine tanker by a coupling device according to the present invention.

FIG. 2 is an enlarged side elevation with portions being broken away of a coupling device of the present invention.

FIG. 3 is a perspective view of a single rotary clamp according to the present invention.

FIGS. 4 and 5 are end views of the rotary clamp showing the clamping jaw in different operating positions.

FIGS. 6 and 7 are similar to FIG. 2 but showing the coupling device of the present invention in different stages of operation.

DESCRIPTION OF THE PREFERRED EMBODIMENT

An application of the present invention is broadly illustrated in FIG. 1 wherein the outboard end of a marine loading arm 10 on a pier or tanker (not shown) has its outer end connected by a plurality of coupling devices 11 to a manifold 14 of a tanker or other marine vessel 15 moored in the water near the first tanker. The loading arm is used to carry fluid, such as petroleum, from compartments in a first tanker to an offshore facility, such as compartments in a second tanker, in the usual manner.

The outboard end of the arm 10 comprises a triple swivel joint assembly 18 composed of swivel joints 19a, 19b and 19c interconnected through pipe elbows 20a, 20b and by pipe sections 21a and 21b. A butterfly valve 25 is connected between the elbow 20b and a pipe spool 26. A conical connector 29 having a flange 29a is connected to the swivel joint 19c and a second conical connector 30 having a flange 30a is connected to the manifold 14 of the tanker 15. It is to the flange 29a that the coupling devices 11 of the present invention are directly attached.

The coupling devices 11 are used to secure the outer end of the loading arm 10 to the manifold 14 of the tanker 15 in a fluid-tight manner, and more specifically by clamping the pipe flange 29a to the opposing pipe flange 30a on the end of the manifold 14. As shown in FIGS. 2, 6 and 7, these rotary coupling devices 11 are secured in circumferentially spaced relation to the pipe flange 29a by bolts 33 that are threaded into spaced holes 34 in the flange 29a. Further details of the spacing of the devices and the relation of the devices to the connector flanges can be seen in the prior U.S. Pat. No. 3,830,533 to Mezei et al.

Each rotary coupling device 11 includes a housing 37 (FIG. 3) with a lateral bracket 37a for securing it to the loading arm's flange 29a. The bracket 37a has two holes 38, one of which is clearly visible in FIG. 3, positioned to coincide with the holes 34 in the flange 29a and through which the bolts 33 extend. The housing 37 has a deep bore 41 (FIG. 2) extending from its front end 42, and a relatively shallow, smaller diameter bore 45 extending from the bottom of the bore 41. A hole 46 extends from the bottom of the bore 45 through the back end 49 of the housing 37, this hole 46 having a considerably smaller diameter than the bore 45. As seen in FIG. 2, the bores 41, 45 and the hole 46 are coaxial and form annular shoulders 50, 51 in the interior of the housing 37. A plurality of arcuate drawbore retainer plates 54, each having an inwardly extending radial flange 54a, are removably secured to the back end 49 of the housing 37 by a plurality of flathead screws 55. The housing 37 also has a stop portion 37b (FIG. 3) extending forwardly of its front end 42.

The housing 37 contains a clamp assembly, indicated generally at 58 (FIG. 2), consisting of a clamp arm 59, a draw bolt 62, a swing spring 63, and an anti-gravity spring 66. The clamp arm 59 has a cylindrical stem 59a with a threaded interior bore 67 open at one end, a lateral jaw 59b with two sides 71, 72 (FIG. 3) and two bosses 75 extending outwardly from its inner surface 59c. The clamp's arm stem 59a (FIG. 2) slidably fits within the housing bore 41, and an O-ring or other annular seal element 76 establishes a seal between the stem and the bore to preclude entry of dirt, etc. and escape of grease or other lubricant. A bar can be inserted between the two bosses 75 and used to rotate the clamp arm 59 relative to the housing 37 if, for any reason, it should be frozen thereto. If it should freeze up so that the clamp arm 59 is not free to move, the draw bolt 62 can be held against rotation while the clamp arm is freed by inserting a bar between the bosses and applying a torque to it.

The draw bolt 62 (FIG. 2) includes an elongated hexagonal head 62a with a transverse hole 79 therethrough and a threaded shank 62b. The hole 79 is provided to allow for the use of the bar tool in turning the drawbolt head, which head can of course also be turned by a wrench. A shank flange 62c, spaced from the head 62a by a peripheral groove 62d, cooperates with the plates 54 to retain the drawbolt in its functional position illustrated in FIG. 2.

A generally semicircular kickoff finger 69 (FIGS. 2–7) extends radially outward from the stem 59a of the clamp arm 59. In the closed position (FIGS. 2–4) the finger 69 extends radially outward from the flange 30a so that the conical connector 30 can be moved into coupling position inside the conical connector 29 without having the finger 69 interfere with the axial movement of the flange 30a. In the open position (FIGS. 5 and 7) the finger 69 is positioned to contact the flange 30a and to force the cone 30 away from the cone 29 when the drawbolt 62 is rotated in the unthreaded direction. Rotation of the drawbolt 62 in the unthreaded direction causes the clamp arm 59 and the finger 62 (FIG. 7) to move away from the flange 29a and to force the flanges 30a and 29a apart to provide a positive disconnect of the conical connectors 29 and 30. Without this positive disconnect feature the conical connectors may stick together and be difficult to separate. The kickoff finger may also be used with other types of connectors, however, the conical connectors tend to stick together more than the other commonly used connectors.

Details of the conical connectors 29 and 30 and swivel joint 19c may be seen in FIGS. 2, 6 and 7. The male connector 30 is welded or otherwise connected to the free end of the manifold 14 while the female connector 29 is connected to the swivel joint 19c. The joint 19c may be any of the conventional swivel connections which are used with marine loading arms. As shown in FIG. 2, a cup 22 constitutes the outer race of a plurality of ball bearings 23, while the adjacent end 29b of the cone 29 forms the inner race of the bearings. An O-ring or other annular seal 65 establishes a barrier between the cup 22 and the cone 29 to keep out dirt, etc. and prevent the escape of grease or other lubricant. The conical connector 29 and the conical connector 30 each employs a pair of O-rings or other annular seal elements 64 to provide a fluid-tight seal between the inner wall of the connector 29 and the outer wall of the connector 30.

Each coupling device is assembled by first introducing the drawbolt 62 into the housing hole 46, and then fastening the plates 54 to the housing 37 so that the drawbolt's shank flange 62c is rotatably disposed between the retainer flanges 54a and the housing's back end 49. The anti-gravity spring 66 is then installed over the drawbolt's shank 62b and positioned in the housing bore 45. The swing spring 63 is placed in the stem bore 67 of the housing clamp 59 and the stem 59a is slipped into the housing bore 41, there being a slight radial clearance between the stem and the bore to provide a sliding fit therebetween. While the clamp jaw 59b is held against rotation, the drawbolt shank 62b is rotated by means of a bar in the hole 79 or a wrench on the head 62a, to thread it onto the shank 59a until the clamp arm 59 reaches the position, in relation to the housing, shown in FIG. 2. The bar or wrench may then be removed, or left in position for later use in performing clamping and unclamping procedures.

In the assembled clamp the anti-gravity spring 66 is compressed between the end of the stem 59a and the shoulder 51, thereby urging the stem 59a outwardly of the housing bore 41 and creating frictional contact between the clamp arm 59 and the spring 66, between the spring and the housing shoulder 51, and also between the housing's back end 49 and the drawbolt's flange 62c. These frictional engagements prevent the clamping jaws 59b from self-rotating into a downward position in response to the action of gravity. Although the springs 66 may be deleted, it is preferably included for the convenience it affords during the clamping and unclamping operations.

The swing spring 63 is compressed between the bottom of the stem bore 67 and the end of the drawbolt shank 62b, thus creating friction between the engaging threads of the shank and the bore. This friction acts to rotate the clamp arm 59 relative to the housing 37 when the drawbolt 62 is rotated, and the housing stop portion 37b limits the rotation of the arm 59 between its "closed" position, as best shown in FIG. 4, and its "open" position as indicated in FIG. 5. Spring 63 could be eliminated and the rotary clamp 11 would still function, but it would then be necessary to rotate the clamp's jaw 59b into the desired position directly by hand, an undesirable and potentially unsafe practice that could result in injury to the operator should his hand get caught during the relative movement between the two tankers.

Accordingly, it is seen that the anti-gravity spring 66 and the swing spring 63 contribute significantly to the safe and rapid use of the rotary clamp 58. The spring 66 keeps the jaw 59b in constant position until the spring acts, upon rotation of the drawbolts 62, to swing the jaw in the desired position. This cooperation is of great advantage especially when only one operator is available to perform the coupling or uncoupling task, as the clamp can be opened or closed with one hand, for example, the other hand is employed to guide and hold the arm in manifold flanges in coupling position.

The radial flange 54a of the retainer plate 54 extend into the drawbolt's shank groove 62d (FIG. 2) and thereby prevent the drawbolt from backing out of the housing 37 as it is being rotated to unthread it from the clamp arm stem 59a. Normally the clamp arm slides freely in the housing, but over torquing the drawbolts, inadequate lubrication in the clamp arm and the housing 41, or excessive wear of the sweating surfaces in the bore could lead to a condition preventing movement of the clamp arm in the housing. Such a situation could cause the drawbolt to attempt to back out of the housing (i.e., move to the right as viewed in FIG. 2) as it is rotated to unthread it from the clamp arm until the shank flange 62c comes to rest against the retainer flanges 54a. From this point, further unthreading rotation of the drawbolt will force the clamp arm to move outwardly of the housing, i.e., to the left as viewed in FIG. 2.

It may be observed that in each of the coupling devices 11 (FIG. 3) the stop means 37b provides two stop surfaces 81, 82 along its lateral edges for stopping the clamp arm 59 in first and second rotational positions, and that the drawbolt 62 (FIG. 2) and the clamp arm 59 are free to rotate relative to each other. Therefore, each of the coupling devices can be disengaged from the manifold flange 30a by rotation of its drawbolt in the unthreaded direction, thereby both rotating the clamp arm 59 until it comes to rest against the surface 81 (FIG. 5) of the stop 37b and translating it outwardly of the housing 37 to the left as viewed in FIG. 7. Conversely, the coupling device 11 can be engaged with the flange 30a by rotating the drawbolt in the threaded direction, thus both rotating the clamp arm 59 against the surface 82 (FIGS. 3 and 4) of the stop 37b and translating it inwardly of the housing 37, i.e., toward the right in FIG. 2.

In order to couple the loading arm 10 to the tanker manifold 14 by means of the devices 11, the loading arm with its devices in their open position (as shown in FIGS. 5 and 6) is maneuvered to position the conical connector 30 inside the conical connector 29 with the flange 30a adjacent the flange 29a. The drawbolts of the devices 11 are then rotated in their threaded direction, thereby rotating the clamp arms 59b into their closed position (shown in FIGS. 2 and 4) and drawing them in against the back of the flange 30a. This pulls the conical connector 30 into a fluid-tight relation with the conical connector 29.

Uncoupling the loading arm 10 from the manifold flange 30a is accomplished by rotating the drawbolts 62 in their unthreaded direction thereby causing the clamp arms 59 to release their tight grip on the flange 30a and rotate into their "open" position wherein their sides 71 lie against the surfaces 81 of the stops 37b as shown in FIG. 5. In the open position the kickoff fingers 69 are adjacent the manifold flange 30a (FIGS. 5 and 6) so that further rotation of the drawbolts 62 in the unthreaded direction moves the fingers 69 against the flange 30a (FIG. 7) forcing the flange 30a and the conical connector 30 away from the conical connector 29 to provide positive separation of the connectors 29 and 30. The loading arm is then free to be maneuvered away from the tanker 15 and placed in its stowed position (not shown).

A plurality of coupling devices 11 on a loading arm can easily be made to operate simultaneously by providing a chain or belt drive attached to the drawbolt heads or each of the devices may be attached to an individual motor to provide power for actuation. Such devices can be driven by a hydraulic or electric motor or by other suitable means. The devices are inexpensive, simple, quick acting and provide positive connection and positive disconnection of the pipe connectors.

Although the best mode contemplated for carrying out the present invention has been herein shown and described, it will be apparent that modification and variation may be made without departing from what is regarded to be the subject matter of the invention.

What is claimed is:

1. A coupling device for releasably connecting two pipes together, each pipe having a flange thereon, said device comprising:
   a housing with an internal, open-ended bore;
   means for securing said housing to a first one of said flanges;
   a clamp arm slidably mounted in said bore of said housing;
   movable clamping means mounted on said clamp arm for contacting a second one of said flanges and for moving said second flange toward said first flange as said clamp arm slides into said bore;
   movable disconnect means mounted on said clamp arm for contacting said second flange and for moving said second flange away from said first flange as said clamp arm slides outwardly in said bore; and
   means for moving said clamp arm lengthwise in said bore of said housing and for pivoting said clamping means and said disconnect means between first and second positions, wherein in said first position said clamping means is located to contact said second flange when said first and said second flanges are axially aligned and in said first position said disconnect means is located aside from said axial alignment, and in said second position said clamping means is located aside from said axial alignment and said disconnect means is located to contact said second flange when said first and said second flanges are axially aligned.

2. A coupling device as defined in claim 1 including first and second conical shaped connectors each connected to a corresponding one of said flanges.

3. A coupling device as defined in claim 1 wherein said means for moving said clamp arm in said bore includes a drawbolt with a head and a threaded shank, and wherein said clamp arm includes a threaded open-end bore, said drawbolt being disposed with its shank fitted loose through an opening in said housing and screw threaded into the threaded clamp arm bore.

4. A coupling device as defined in claim 3 including means for preventing the drawbolt from backing out of the housing internal bore as it is rotated.

5. A coupling device as defined in claim 1 wherein said disconnect means includes a generally semicircular kickoff finger and means for connecting said kickoff finger to said clamp arm so that said finger extends radially outward from said bore in said housing.

6. A coupling device as defined in claim 5 including means for moving said kickoff finger in position to contact said second flange when said clamp arm moves outwardly in said housing bore, to thereby force said second flange axially apart from said first flange.

7. A coupling device as defined in claim 5 including means for moving said kickoff finger radially away from said second flange when said clamp arm moves inwardly in said housing bore, and means for moving said kickoff finger radially toward said second flange when said clamp arm moves outwardly in said housing bore.

8. A coupling device for releasably connecting two pipes together, each pipe having a flange thereon, said device comprising:
- a housing with an internal, open-ended bore;
- mounting means for securing said housing to a first one of said flanges;
- a clamp arm with a stem and a lateral jaw at one end, said stem having a threaded, open-ended bore and being slip-fitted into said housing bore;
- a drawbolt with a head and a threaded shank, said drawbolt being disposed with its shank fitted loose through an opening in said housing and screw threaded into said stem bore;
- a generally radially extending finger secured to said stem of said clamp arm; and
- a stop on the open end of said housing near the jaw of said clamp arm, said clamp arm being rotatable in relation to said housing to swing the jaw into and out of abutment with said stop;
- whereby rotation of said drawbolt in a first direction results in said jaw swinging into position to contact a second of said flanges and to draw said first and said second flanges toward each other, and rotation of said drawbolt in a second direction results in said finger swinging into position to contact said second flange and to push said first and said second flanges axially away from each other.

9. A coupling device as defined in claim 8 wherein rotation of said drawbolt in said first direction results in an inward translatory sliding movement of said clamp arm stem within said housing bore when said jaw abuts said stop, to move said jaw toward said mounting means, and rotation of said drawbolt in said second direction results in an outward translatory sliding movement of said clamp arm stem to move said finger away from said mounting means.

10. A coupling device as defined in claim 8 wherein said finger includes a generally semicircular element extending radially outward from said stem of said clamp arm.

11. A coupling device as defined in claim 8 including means for exerting a force between said drawbolt and said clamp arm to cause said jaw to swing against one or the other side of the stop during rotation of said drawbolt, the position of said jaw relative to said stop being determined by the direction of rotation of said drawbolt.

12. A coupling device as defined in claim 8 wherein said mounting means comprises a bracket with at least one hole for accepting a fastening means to secure the housing to a pipe flange.

* * * * *